United States Patent
Watanabe (10) Patent No.: US 10,030,744 B2
(45) Date of Patent: Jul. 24, 2018

(54) TENSIONER

(71) Applicant: TSUBAKIMOTO CHAIN CO., Osaka-shi, Osaka (JP)

(72) Inventor: Masanori Watanabe, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 15/242,925

(22) Filed: Aug. 22, 2016

(65) Prior Publication Data

US 2017/0059012 A1     Mar. 2, 2017

(30) Foreign Application Priority Data

Aug. 25, 2015  (JP) .................. 2015-165538

(51) Int. Cl.
    *F16H 7/22*    (2006.01)
    *F16H 7/08*    (2006.01)

(52) U.S. Cl.
    CPC ... *F16H 7/0848* (2013.01); *F16H 2007/0812* (2013.01); *F16H 2007/0814* (2013.01); *F16H 2007/0859* (2013.01)

(58) Field of Classification Search
    CPC ..... F16H 2007/0812; F16H 2007/0859; F16H 2007/0806; F16H 7/0848; F16H 7/0836
    USPC ........................................... 474/110
    See application file for complete search history.

(56) References Cited

U.S. PATENT DOCUMENTS

| | | | | |
|---|---|---|---|---|
| 4,997,411 A | * | 3/1991 | Breon | F16F 1/08 474/110 |
| 5,304,099 A | * | 4/1994 | Deppe | F16H 7/0848 474/110 |
| 5,720,684 A | * | 2/1998 | Mott | F16H 7/0848 474/101 |
| 6,086,497 A | * | 7/2000 | Fukuda | F16H 7/0836 474/101 |
| 7,226,376 B2 | * | 6/2007 | Konishi | F16H 7/0836 474/110 |
| 7,458,909 B2 | * | 12/2008 | Hashimoto | F16H 7/0848 474/110 |
| 7,699,730 B2 | * | 4/2010 | Emizu | F16H 7/0836 474/110 |
| 7,918,754 B2 | * | 4/2011 | Kurematsu | F16H 7/0848 474/110 |
| 7,927,242 B2 | * | 4/2011 | Namie | F16H 7/0848 474/101 |

(Continued)

FOREIGN PATENT DOCUMENTS

JP    2008-215553 A    9/2008

*Primary Examiner* — Henry Y Liu
(74) *Attorney, Agent, or Firm* — Westerman, Hattori, Daniels & Adrian, LLP (57) ABSTRACT

Provided is a simple-structured tensioner that can reduce processing and assembling workload and maintain the tensioner performance constant, as well as store a sufficient amount of oil. The tensioner includes a plunger 20, a housing 30, an inner sleeve 40, a check valve 50, and a biasing unit 60. The inner sleeve 40 includes a cylindrical body 41 having an inner part that serves as an oil reservoir chamber 13, a sleeve bottom 42 formed at one end of the cylindrical body 41, an oil hole 43 formed in the sleeve bottom 42, and a ball seat 44 which protrudes in a cylindrical shape toward an oil pressure chamber 12 integrally with and continuously from an edge of the oil hole 43 and on which a check ball 51 is seated.

7 Claims, 6 Drawing Sheets (56) References Cited

U.S. PATENT DOCUMENTS

| | | | | |
|---|---|---|---|---|
| 8,323,135 | B2* | 12/2012 | Namie | F16H 7/0836 474/101 |
| 2002/0022541 | A1* | 2/2002 | Ullein | F16H 7/0836 474/110 |
| 2003/0216202 | A1* | 11/2003 | Emizu | F16H 7/0836 474/109 |
| 2005/0014587 | A1* | 1/2005 | Konishi | F16H 7/0836 474/110 |
| 2008/0220918 | A1* | 9/2008 | Namie | F16H 7/0836 474/110 |
| 2014/0187367 | A1* | 7/2014 | Todd | F16H 7/08 474/110 |
| 2014/0187368 | A1* | 7/2014 | Todd | F16H 7/08 474/110 |
| 2016/0084359 | A1* | 3/2016 | Wigsten | F16H 7/0836 474/110 |

* cited by examiner

Related Art

Fig. 7

Related Art

TENSIONER

BACKGROUND OF THE INVENTION

1. Field of the Invention

The present invention relates to a tensioner that provides appropriate tension to a running chain, belt, or the like.

2. Description of the Related Art

It has been common practice to use a tensioner for maintaining appropriate tension in a chain or the like. For example, a known chain guide mechanism, which slidably guides a transmission chain, such as an endless roller chain passing over respective sprockets of a crankshaft and of a cam shaft inside an engine room, uses a tensioner to bias a tensioner lever in order to maintain appropriate tension of the chain or the like.

Figure 6:
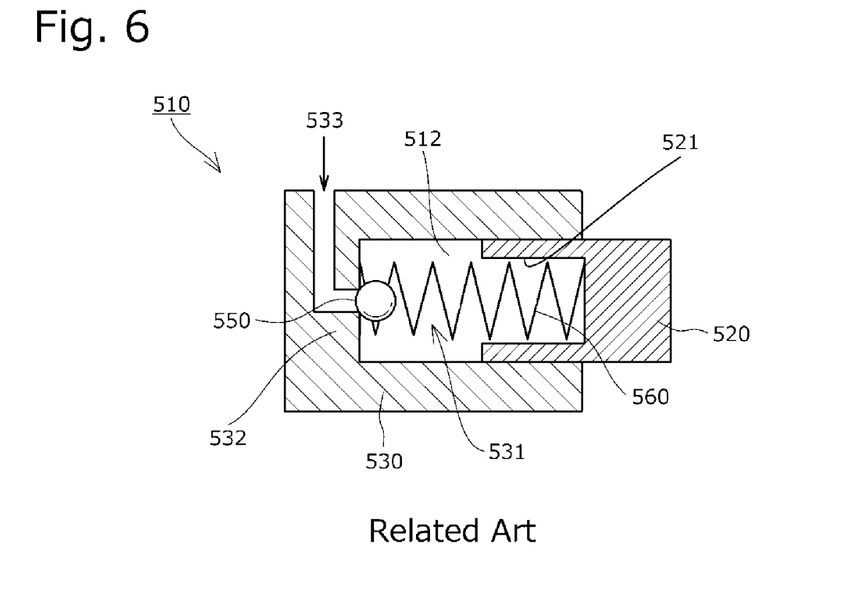
FIG. 6 is a cross-sectional view schematically illustrating a conventional tensioner.

The known tensioner 510 used in such a chain guide mechanism includes, for example, as shown schematically in FIG. 6, a housing 530 having a cylindrical plunger bore 531 that is open on a front side, a cylindrical plunger 520 slidably inserted in the plunger bore 531, and a biasing unit that biases the plunger 520 toward the front side. The biasing unit is formed by a coil spring 560 accommodated inside a plunger hole 521 of the cylindrical plunger 520 and compressed between the plunger and the housing bottom 532.

Oil is supplied from an oil supply hole 533 formed in the housing 530, so that an oil pressure chamber 512 formed between the plunger bore 531 and the plunger 520 is filled with the oil, which oil biases the plunger 520 toward the front side. A check valve 550 (schematically shown only as a check ball) prevents the oil from flowing out from the oil supply hole 533. As the plunger 520 reciprocates, the oil flows through the small gap between the plunger 520 and the plunger bore 531, and the flow resistance provides the damping effect of slowing down the reciprocal movement of the plunger 520.

In such a known tensioner 510, when let stand for a long time after the oil supply is stopped (in the case with an engine, after the engine is stopped), there is a time lag before the oil is supplied immediately after the next start-up, and as no oil is replenished but the oil in the oil pressure chamber 512 only leaks out when the plunger 520 moves back and forth, there occurs a shortage of oil in the oil pressure chamber 512. Because of this shortage of oil, the damping force of the oil does not act on the plunger 520, which sometimes may lead to vibration and abnormal noise of the timing chain, or damage on the timing chain.

Figure 7:
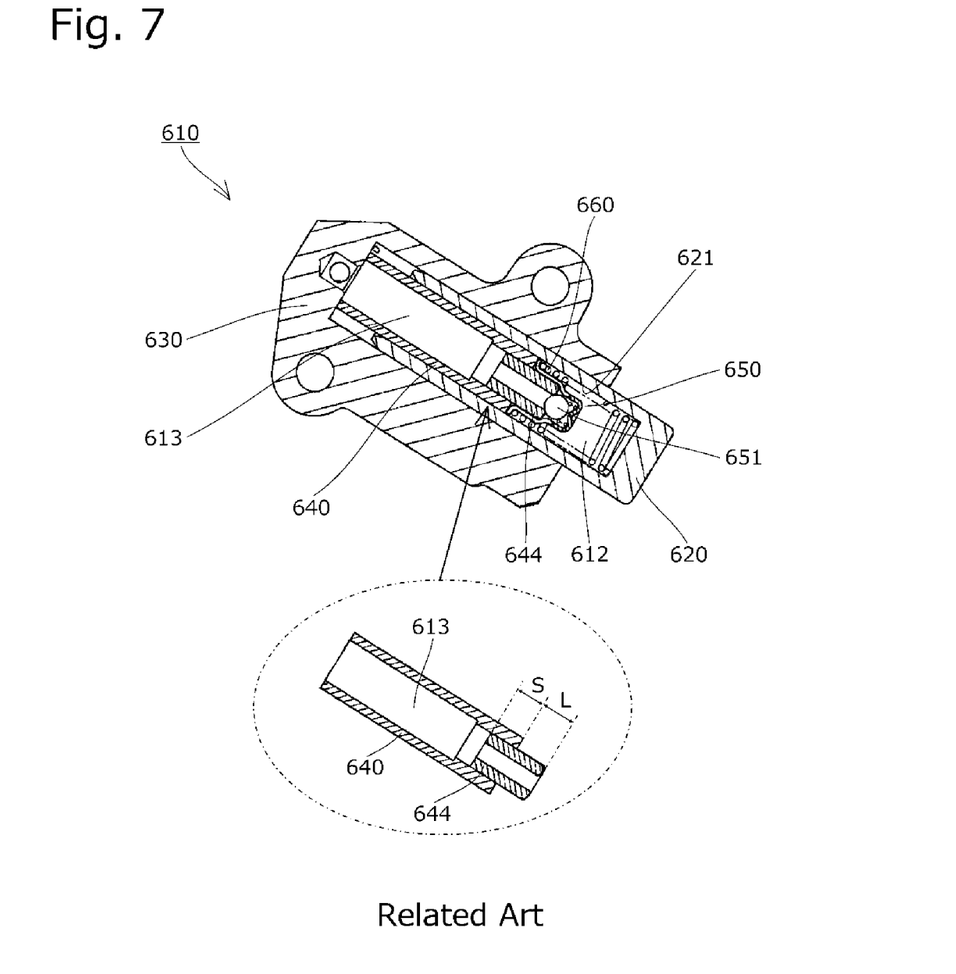
FIG. 7 is a cross-sectional view illustrating another conventional tensioner.

Therefore, a tensioner is known, such as the tensioner 610 of Japanese Patent Application Laid-open No. 2008-215553 shown in FIG. 7, which is designed to have an oil reservoir chamber 613 inside the plunger 620 to supply oil into the oil pressure chamber 612 from the oil reservoir chamber 613. A constant amount of oil is retained in the oil reservoir chamber 613 such as not to leak out, so that, even immediately after the start-up after a long stop, the oil remaining in the oil reservoir chamber 613 is supplied to the oil pressure chamber 612, to maintain the damping force of oil for the plunger 620, reduce vibration and prevent damage of the chain.

In the tensioner 610 shown in FIG. 7, an inner sleeve 640 is disposed inside the plunger hole 621 on the rear side, so that an internal space formed between the housing 630 and the plunger 620 is divided by the inner sleeve 640 into the oil pressure chamber 612 on the front side and the oil reservoir chamber 613 on the rear side. A check valve 650 is disposed on one side of the inner sleeve 640 facing the oil pressure chamber 612 for preventing the oil from flowing reversely from the oil pressure chamber 612 into the oil reservoir chamber 613, so that a constant amount of oil is retained in the oil reservoir chamber 613 without leakage, and even immediately after the start-up after a long stop, the oil remaining in the oil reservoir chamber 613 is supplied to the oil pressure chamber 612.

In this tensioner 610, a cylindrical ball seat 644 on which a check ball 651 is seated is press-fitted to the front end of the inner sleeve 640 that faces the oil pressure chamber 612. As a result, unlike the case where the ball seat 644 is fixed to the inner sleeve 640 with the use of a biasing force of a coil spring 660, the inner sleeve 640 and the check valve 650 can be assembled together easily.

SUMMARY OF THE INVENTION

In the tensioner 610 described in Japanese Patent Application Laid-open No. 2008-215553, the stroke of the check ball 651 varies depending on the protruding length L of the ball seat 644 from the front end of the inner sleeve 640, as shown in FIG. 7. This protruding length L must therefore be controlled precisely. However, the problem is that controlling this protruding length L precisely is difficult when the ball seat 644 is press-fitted to the inner sleeve 640.

In order to firmly attach the ball seat 644 to the inner sleeve 640, an amount of insertion S by which the ball seat 644 is inserted into the inner sleeve 640 needs to be at least a certain amount. This leads to another problem that, if a sufficient amount of insertion S is secured, the space inside the oil reservoir chamber 613 will be reduced by that amount.

Since the ball seat 644 is press-fitted to the inner sleeve 640, the ball seat 644 and the inner sleeve 640 must be designed to have a large thickness to ensure their strength, which leads to another problem that the available space inside the oil reservoir chamber 613 is compromised.

The ball seat 644 may be displaced from its set position relative to the inner sleeve 640, or come off of the inner sleeve 640 when a high pressure is applied from the oil reservoir chamber 613 to the ball seat 644. Hence another problem that the tensioner 610 may not be fit for use in a car engine where such a high pressure may be input.

When the inner sleeve 640 and the ball seat 644 are made from different materials, there will be a difference in the degree of thermal deformation, and this difference in thermal deformation may result in a misalignment between the inner sleeve 640 and the ball seat 644 and change the tensioner performance.

The present invention is directed at solving these problems and it is an object of the invention to provide a simple-structured tensioner that can reduce the processing and assembling workload and maintain the tensioner performance constant, as well as store a sufficient amount of oil.

The present invention solves the problems described above by providing a tensioner including: a plunger having a plunger hole that is open on a rear side; a housing having a plunger bore that is open on a front side and accommodates the plunger; an inner sleeve disposed inside the plunger hole and dividing an internal space formed between the housing and the plunger into an oil pressure chamber and an oil reservoir chamber; a check valve disposed inside the plunger hole and preventing oil from flowing reversely from the oil pressure chamber into the oil reservoir chamber; and a biasing unit that biases the plunger toward the front side. The check valve includes a check ball. The inner sleeve includes a cylindrical body having an inner part that serves as the oil reservoir chamber, a sleeve bottom formed at one end of the cylindrical body, an oil hole formed in the sleeve bottom, and a ball seat which protrudes in a cylindrical shape toward the oil pressure chamber integrally with and continuously from an edge of the oil hole and on which the check ball is seated.

According to one aspect of the present invention, the inner sleeve includes a ball seat protruding in a cylindrical shape toward the oil pressure chamber integrally with and continuously from the edge of the oil hole. By forming the cylindrical body and the ball seat integrally, the number of components and assembling workload can be reduced. Moreover, since the protruding length of the ball seat from the distal end of the cylindrical body can be readily controlled with high precision, variations in the stroke of the check ball for each tensioner can be prevented. Also, even when a high pressure is applied to the ball seat or when the temperature inside the car engine is high, the ball seat can be prevented from being displaced from or come off of the cylindrical body, so that the tensioner performance can be maintained constant.

Moreover, since the cylindrical body and the ball seat are formed integrally, the length of an overlapping portion between the cylindrical body and the ball seat in the front to back direction can be reduced as compared to when the ball seat is press-fitted to the inner sleeve, and also, the inner sleeve can be designed thinner. Accordingly, the oil reservoir chamber can have a larger space to store more oil.

The ball seat is formed in the sleeve bottom that has a smaller thickness, and protrudes in a cylindrical shape toward the oil pressure chamber integrally with and continuously from the edge of the oil hole. Therefore, the ball seat can be formed by a drawing process, and so the production workload can be reduced.

According to another aspect of the present invention, the oil hole includes, on one side close to the oil reservoir chamber, a diameter-reduced portion with a diameter thereof decreasing from the side close to the oil reservoir chamber toward the oil pressure chamber. Thus the oil can be smoothly supplied from the oil reservoir chamber into the oil pressure chamber. When the ball seat is formed by a drawing process, such a diameter-reduced portion can be formed on one side of the oil hole facing the oil reservoir chamber without performing any additional process, so that an increase in the production workload can be avoided.

According to another aspect of the present invention, the housing includes a housing oil supply hole for supplying oil to the oil reservoir chamber. Therefore, also in tensioners designed to have an oil reservoir chamber on the rear side of the oil pressure chamber, the oil can be supplied smoothly from the outside of the tensioner into the oil reservoir chamber.

According to another, aspect of the present invention, a connection/adjustment indentation is formed at least in one of an outer circumferential surface of the plunger and an inner circumferential surface of the plunger bore. The housing includes a housing oil supply hole for supplying oil to the connection/adjustment indentation. The plunger includes a plunger oil supply hole for supplying oil from the connection/adjustment indentation into the plunger hole. The inner sleeve includes a sleeve oil supply hole that connects the plunger oil supply hole with the oil reservoir chamber. Therefore, also in tensioners designed to have an oil reservoir chamber on the front side of the oil pressure chamber, the oil can be supplied smoothly from the outside of the tensioner into the oil reservoir chamber.

DESCRIPTION OF THE PREFERRED EMBODIMENTS

A tensioner 10 according to a first embodiment of the present invention will be described with reference to the drawings.

First, the tensioner 10 of this embodiment is incorporated in a chain transmission used in a timing system or the like of a car engine. The tensioner is attached to an engine block to apply appropriate tension to the slack side of a transmission chain passing over a plurality of sprockets via a tensioner lever to reduce vibration during the drive.

Figure 1:
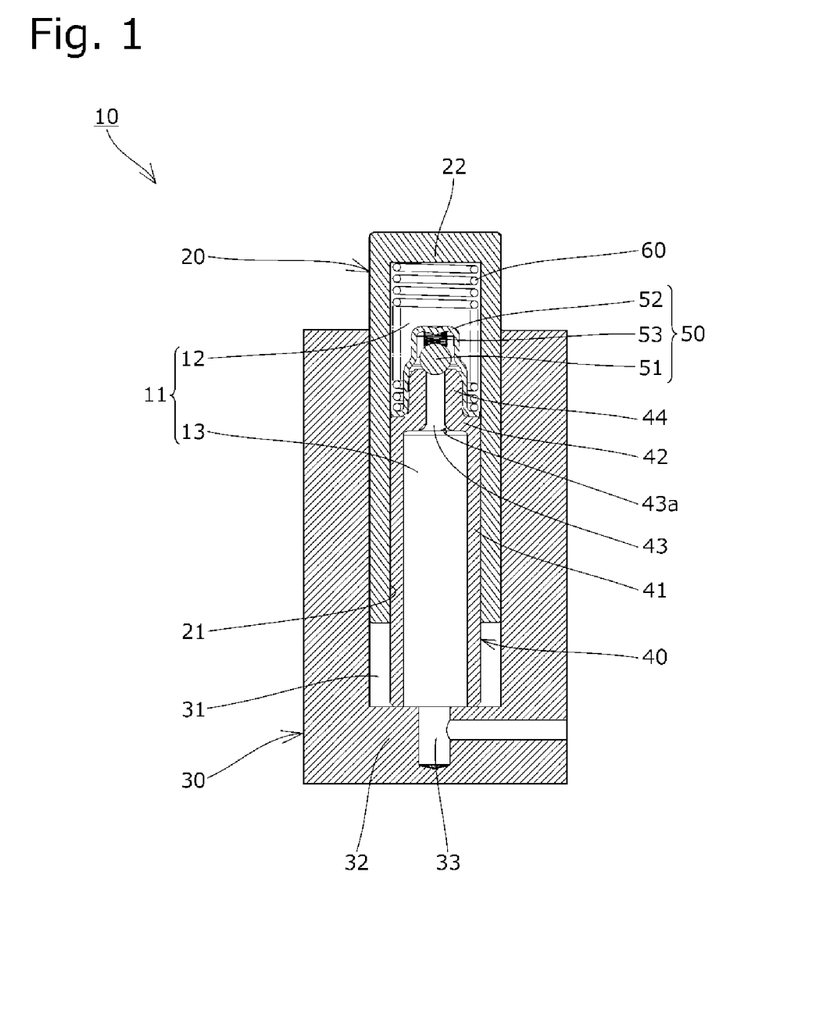
FIG. 1 is a cross-sectional view illustrating a tensioner according to a first embodiment of the present invention.

The tensioner 10 includes, as shown in FIG. 1, a plunger 20 having a plunger hole 21 that is open on a rear side, a housing 30 having a plunger bore 31 that is open on a front side and accommodates the plunger 20, an inner sleeve 40 slidably set inside the plunger hole 21, a check valve 50 disposed inside the plunger hole 21, and a coil spring 60 as a biasing unit disposed inside the plunger hole 21 to bias the plunger 20 toward the front side.

The housing 30 includes, as shown in FIG. 1, the plunger bore 31, a housing bottom 32 formed on the rear side, and a housing oil supply hole 33 formed in the housing bottom 32 to supply oil from the outside into an oil reservoir chamber 13.

The inner sleeve 40 is made from a metal such as iron or the like and includes, as shown in FIG. 1, a cylindrical body 41, the inside of which functions as the oil reservoir chamber 13, a sleeve bottom 42 formed at the front end of the cylindrical body 41, an oil hole 43 formed in the sleeve bottom 42, and a ball seat 44 protruding in a cylindrical shape toward the front side (toward the oil pressure chamber 12) integrally with and continuously from the edge of the oil hole 43.

The ball seat 44 functions as a seat for a check ball 51 to sit on the front side thereof. The ball seat 44 is formed by a drawing process wherein the sleeve bottom 42 is pressed from the rear face toward the front face, and as a result of this drawing process, a diameter-reduced portion 43a is formed on the rear side of the oil hole 43 (on the side close to the oil reservoir chamber 13) as shown in FIG. 1, the diameter-reduced portion 43a having a diameter decreasing from the rear side toward the front side. The cylindrical body 41 and the sleeve bottom 42 may also be formed by a drawing process.

The inner sleeve 40 is set inside the plunger hole 21, with the sleeve bottom 42 oriented toward the front side, as shown in FIG. 1. The inner sleeve 40 is biased toward the rear side by the coil spring 60 arranged between the plunger bottom 22 and the sleeve bottom 42, so that the rear end of the cylindrical body 41 is in contact with the front face of the housing bottom 32. An internal space 11 formed between the housing 30 and the plunger 20 is divided by the inner sleeve 40 into the oil pressure chamber 12 on the front side and the oil reservoir chamber 13 on the rear side.

The check valve 50 allows the oil to flow in from the oil reservoir chamber 13 into the oil pressure chamber 12, and prevents the oil from flowing reversely from the oil pressure chamber 12 into the oil reservoir chamber 13. As shown in FIG. 1, the check valve is disposed on the front side of the sleeve bottom 42.

As shown in FIG. 1, the check valve 50 is made up of a spherical check ball 51 that is seated on the front end of the ball seat 44 to be capable of tightly contacting therewith, a retainer 52 that restricts the movement of the check ball 51, and a ball spring 53 disposed between the check ball 51 and the retainer 52 for biasing the check ball 51 toward the rear side (toward the ball seat 44). The ball spring 53 is not an essential constituent element and may not be needed depending on the embodiment.

Figure 2:
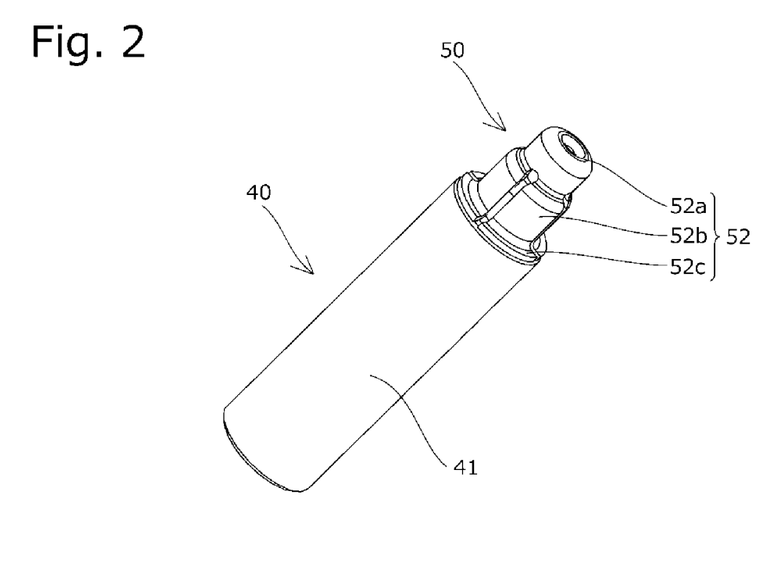
FIG. 2 is a perspective view illustrating an inner sleeve with a check valve mounted therein.
Figure 3:
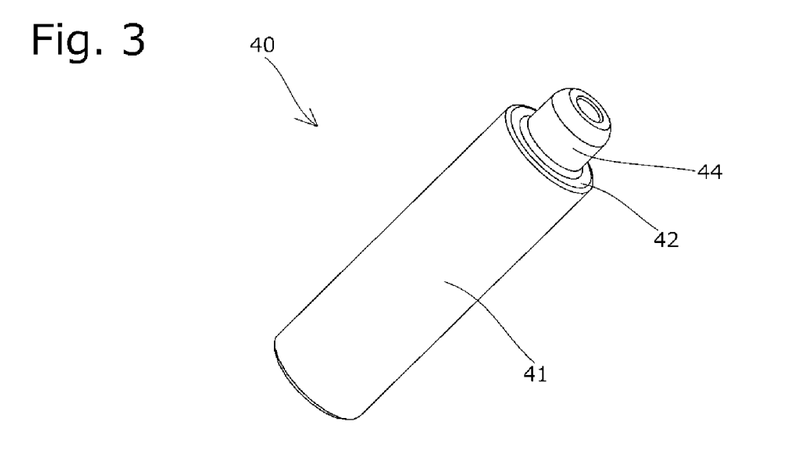
FIG. 3 is a perspective view illustrating the inner sleeve.

The retainer 52 includes, as shown in FIG. 1 and FIG. 2, a substantially disc-like top 52a disposed on the front side of the check ball 51, a skirt 52b extending vertically downward toward the rear side from the peripheral edge of the top 52a and fitted on the radially outer side of the ball seat 44, and a flange 52c extending radially outward from the rear end of the skirt 52b. The skirt 52b and the flange 52c include a plurality of circumferentially arranged slits extending in a front to back direction.

The coil spring 60 is accommodated in the oil pressure chamber 12 so as to freely expand and contract as shown in FIG. 1, more specifically the coil spring 60 is disposed between the rear face of the plunger bottom 22 and the front side of the sleeve bottom 42 (front face of the flange 52c of the retainer 52).

In the tensioner 10 of this embodiment, the inner sleeve 40 includes a ball seat 44 protruding in a cylindrical shape toward the oil pressure chamber 12 integrally with and continuously from the edge of the sleeve bottom 42. Therefore, as shown in FIG. 4, the protruding length L of the ball seat 44 from the distal end of the cylindrical body 41 can be readily controlled with high precision, which helps prevent the stroke of the check ball 51 from varying for each tensioner 10.

Figure 4:
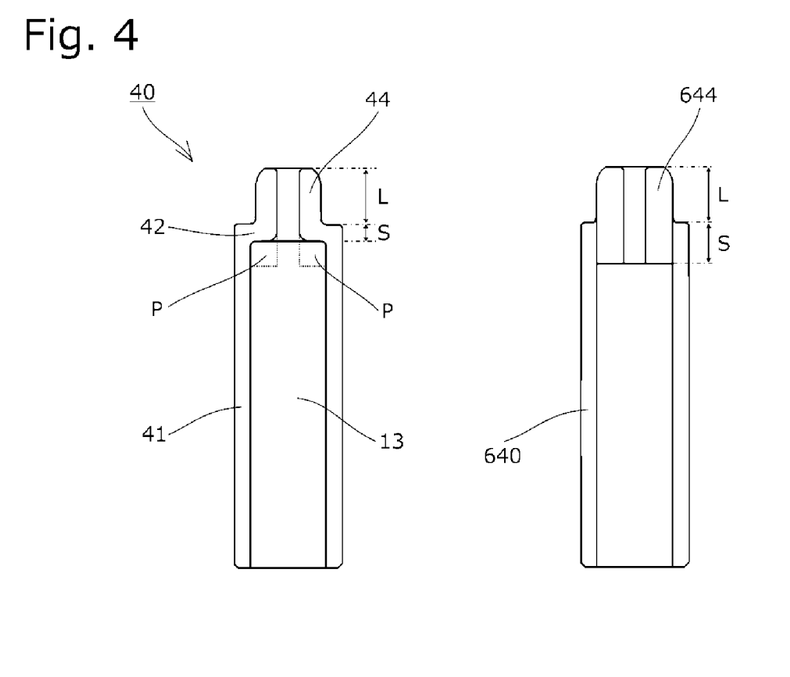
FIG. 4 is an illustrative diagram for explaining various dimensions of the inner sleeve.

Moreover, since the cylindrical body 41 and the ball seat 44 are formed integrally, the length S of an overlapping portion between the cylindrical body 41 and the ball seat 44 in the front to back direction can be reduced as compared to when the ball seat 644 is pressed into the inner sleeve 640 as shown in FIG. 4. Accordingly, the oil reservoir chamber 13 can have a larger space that is increased by the difference P and can store more oil.

Next, a tensioner 10 according to a second embodiment of the present invention will be described with reference to FIG. 5. The second embodiment is, in part, exactly the same as the previously described first embodiment. Therefore, the configuration other than different features will not be described again.

Figure 5:
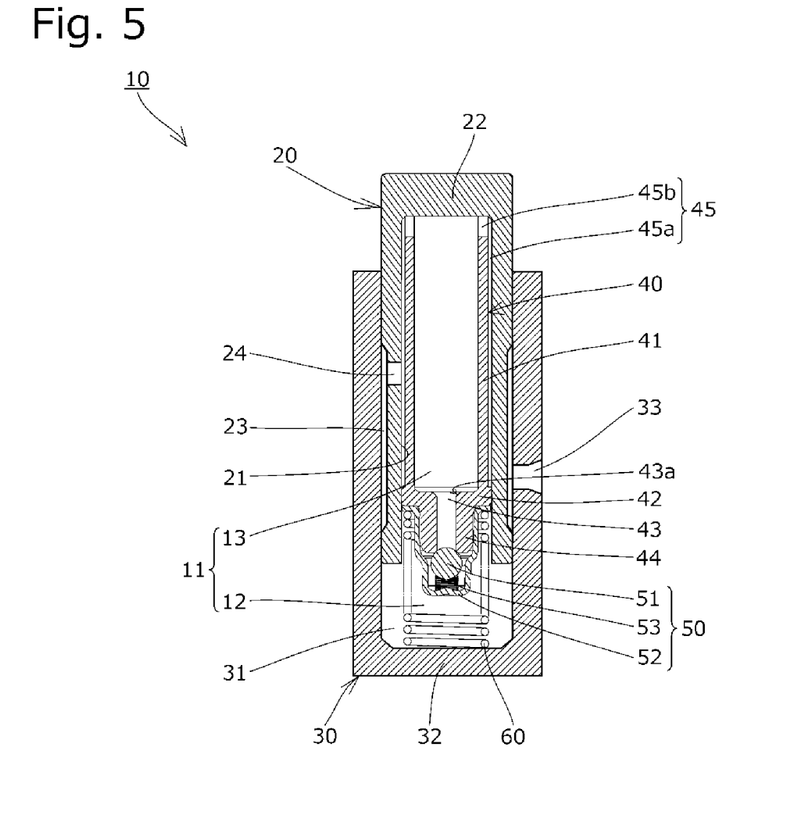
FIG. 5 is a cross-sectional view illustrating a tensioner according to a second embodiment of the present invention.

In the tensioner 10 of the second embodiment, as shown in FIG. 5, the inner sleeve 40 is disposed inside the plunger hole 21 such that, the sleeve bottom 42 is oriented toward the rear side.

The inner sleeve 40 is biased toward the front side by the coil spring 60 arranged between the sleeve bottom 42 and the housing bottom 32, so that the front end of the cylindrical body 41 is in contact with the rear face of the plunger bottom 22.

An internal space 11 formed between the housing 30 and the plunger 20 is divided by the inner sleeve 40 into the oil pressure chamber 12 on the rear side and the oil reservoir chamber 13 on the front side.

The check valve 50 is disposed on the rear side of the sleeve bottom 42.

In the second embodiment, various passages described below are formed to supply oil from the outside of the housing 30 into the oil reservoir chamber 13.

The plunger 20 includes, as shown in FIG. 5, a connection/adjustment indentation 23 formed in the outer circumferential surface thereof so as to extend all around or over a circumferential part thereof, and a plunger oil supply hole 24 extending from the outer circumferential surface through to the inner circumferential surface so as to supply the oil from the connection/adjustment indentation 23 into the plunger hole 21.

The housing 30 includes a housing oil supply hole 33 extending from the outside of the housing 30 through to the plunger bore 31 to supply oil from the outside to the connection/adjustment indentation 23.

The inner sleeve 40 includes a sleeve oil supply hole 45 that connects the oil reservoir chamber 13 with the plunger oil supply hole 24. This sleeve oily supply hole 45 is formed by a small-diameter part 45a on the outer circumference of the cylindrical body 41 and a plurality of cut-out portions 45b at the front end of the cylindrical body 41.

The sleeve oil supply hole 45 may have any specific design as long as it connects the oil reservoir chamber 13 with the plunger oil supply hole 24. For example, it may be a hole extending through the cylindrical body 41 from the inner circumferential surface to the outer circumferential surface thereof.

While the connection/adjustment indentation 23 is formed in the outer circumferential surface of the plunger 20 in the description above, this connection/adjustment indentation 23 may be formed on at least one of the outer circumferential surface of the plunger 20 and the inner circumferential surface of the plunger bore 31.

While embodiments of the present invention have been described in detail, the present invention is not limited to the above-described embodiments and may be carried out with various design changes without departing from the scope of the present invention set forth in the claims.

For example, various configurations of several embodiments described above may be freely combined to form other tensioners.

While the tensioner was described as a component to be incorporated in a timing system of a car engine in the embodiments above, the purpose of use of the tensioner is not limited to this specific application.

Also, while the tensioner was described as a component that applies tension to a transmission chain with a tensioner lever in the embodiments above, the plunger can directly guide the transmission chain slidably with a distal end thereof to apply tension to the transmission chain.

The tensioner may not necessarily be applied to a transmission mechanism with a transmission chain but can also be used for similar transmission mechanisms that use belts, ropes and the like, and can be applied in a variety of industrial fields where it is required to apply tension to an elongated component.

While the housing accommodating the plunger is described as the component known as a tensioner body that is attached to an engine block or the like in the embodiments described above, the housing is not limited to the specific form described above and may be a cylindrical component known as a sleeve inserted into a body hole formed in the tensioner body.

What is claimed is:

1. A tensioner comprising:
 a plunger having a plunger hole that is open on a rear side;
 a housing having a plunger bore that is open on a front side and accommodates the plunger;
 an inner sleeve disposed inside the plunger hole and dividing an internal space formed between the housing and the plunger into an oil pressure chamber and an oil reservoir chamber;
 a check valve disposed inside the plunger hole and preventing oil from flowing reversely from the oil pressure chamber into the oil reservoir chamber; and
 a biasing unit that biases the plunger toward the front side, wherein
 the check valve includes a check ball,
 the inner sleeve being an unitary single piece that includes a) a cylindrical body having an inner part that serves as the oil reservoir chamber, b) a sleeve bottom formed at one end of the cylindrical body, c) an oil hole formed in the sleeve bottom, and d) a ball seat which protrudes in a cylindrical shape toward the oil pressure chamber integrally with and continuously from an edge of the oil hole and on which the check ball is seated, and
 the oil hole includes, on one side close to the oil reservoir chamber, a diameter-reduced portion with a diameter thereof decreasing continuously from the side close to the oil reservoir chamber toward the oil pressure chamber.

2. The tensioner according to claim 1, wherein the inner sleeve is disposed inside the plunger hole, with the sleeve bottom oriented toward the front side,
 the oil reservoir chamber is positioned on the rear side of the oil pressure chamber, and
 the housing includes a housing oil supply hole for supplying oil to the oil reservoir chamber.

3. The tensioner according to claim 1, wherein the inner sleeve is disposed inside the plunger hole, with the sleeve bottom oriented toward the rear side,
 the oil reservoir chamber is positioned on the front side of the oil pressure chamber,
 a connection/adjustment indentation is formed at least in one of an outer circumferential surface of the plunger and an inner circumferential surface of the plunger bore,
 the housing includes a housing oil supply hole for supplying oil to the connection/adjustment indentation,
 the plunger includes a plunger oil supply hole for supplying oil from the connection/adjustment indentation into the plunger hole, and
 the inner sleeve includes a sleeve oil supply part that connects the plunger oil supply hole with the oil reservoir chamber.

4. The tensioner according to claim 1, wherein the unitary single piece inner sleeve has a substantially uniform wall thickness along the cylindrical body and the sleeve bottom to enable increased space (P) of the oil reservoir chamber.

5. The tensioner according to claim 1, wherein the unitary single piece inner sleeve has a substantially uniformly thick wall that is plastically deformed by drawing to form the sleeve bottom and the ball seat, with the sleeve bottom extending substantially perpendicular to the inner sleeve, such as to enable increased space (P) of the oil reservoir chamber.

6. The tensioner according to claim 1, wherein the sleeve bottom extends substantially perpendicular to the inner sleeve.

7. The tensioner according to claim 1, wherein the unitary single piece inner sleeve is a single draw-formed metal piece, wherein the cylindrical shape ball seat has a reduced diameter from the cylindrical body which is plastically deformed during drawing.

* * * * *